United States Patent
Suzuki (10) Patent No.: US 8,051,415 B2
(45) Date of Patent: Nov. 1, 2011

(54) DISK ARRAY APPARATUS, METHOD FOR EXCHANGING FIRMWARE, PROGRAM FOR EXCHANGING FIRMWARE AND STORAGE MEDIUM FOR STORING PROGRAM THEREOF

(75) Inventor: Ryo Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 340 days.

(21) Appl. No.: 12/372,901

(22) Filed: Feb. 18, 2009

(65) Prior Publication Data

US 2009/0210867 A1    Aug. 20, 2009

(30) Foreign Application Priority Data

Feb. 18, 2008    (JP) .................... 2008-036609

(51) Int. Cl.
*G06F 9/44*    (2006.01)
*G06F 3/00*    (2006.01)
*G06F 13/24*   (2006.01)
*G06F 9/26*    (2006.01)

(52) U.S. Cl. .......... 717/168; 710/48; 710/260; 711/202; 711/205

(58) Field of Classification Search .......... 717/168–178; 710/1, 4, 36, 39, 48, 260; 711/202–210
See application file for complete search history.

(56) References Cited

U.S. PATENT DOCUMENTS

| | | | |
|---|---|---|---|
| 6,240,470 B1 | 5/2001 | Murayama et al. | |
| 6,728,833 B2 * | 4/2004 | Pruett et al. | 711/114 |
| 6,907,504 B2 * | 6/2005 | Burton et al. | 711/162 |
| 6,971,095 B2 * | 11/2005 | Hirai et al. | 717/173 |
| 7,032,218 B2 * | 4/2006 | Shirasawa et al. | 717/168 |
| 7,188,237 B2 * | 3/2007 | Zhou et al. | 713/2 |
| 7,231,493 B2 * | 6/2007 | Nguyen et al. | 711/114 |
| 7,447,811 B2 * | 11/2008 | Bita et al. | 710/39 |
| 7,558,915 B2 * | 7/2009 | Cherian et al. | 711/114 |
| 7,681,191 B2 * | 3/2010 | Yuuki | 717/170 |
| 2001/0044934 A1 * | 11/2001 | Hirai et al. | 717/11 |
| 2005/0033933 A1 * | 2/2005 | Hetrick et al. | 711/165 |
| 2006/0015861 A1 | 1/2006 | Takata et al. | |
| 2006/0130039 A1 * | 6/2006 | Yuuki | 717/168 |
| 2006/0271919 A1 * | 11/2006 | Moyer | 717/136 |
| 2008/0184217 A1 * | 7/2008 | Kai | 717/168 |

FOREIGN PATENT DOCUMENTS

| | | |
|---|---|---|
| JP | 1999237957 A | 8/1999 |
| JP | 2000215042 A | 8/2000 |
| JP | 2004005634 A | 1/2004 |
| JP | 2006031312 A | 2/2006 |
| JP | 2006260395 A | 9/2006 |
| JP | 2006338217 A | 12/2006 |

* cited by examiner

*Primary Examiner* — Wei Zhen
*Assistant Examiner* — Qing Chen (57) ABSTRACT

Disclosed is a disk array apparatus which includes disk apparatuses and which reads and writes data of the disk apparatus based on an I/O instruction issued by a host computer, includes: a CPU which carries out a first firmware; a memory which stores the first firmware in a first storage area of physical address space; and a TLB which belongs to the CPU and makes the first storage area of the physical address space of the memory associated with a first logical area of logical address space, wherein in case that the CPU receives a second firmware and an instruction to exchange firmware, the CPU stores the second firmware in a second storage area of the physical address space of the memory, and updates the TLB to make the second storage area associated with the first logical area. A method and program for exchanging firmware are also disclosed.

10 Claims, 6 Drawing Sheets

DISK ARRAY APPARATUS, METHOD FOR EXCHANGING FIRMWARE, PROGRAM FOR EXCHANGING FIRMWARE AND STORAGE MEDIUM FOR STORING PROGRAM THEREOF

This application is based upon and claims the benefit of priority from Japanese patent application No. 2008-036609, filed on Feb. 18, 2008, the disclosure of which is incorporated herein in its entirety by reference.

TECHNICAL FIELD

The present invention relates to a disk array apparatus and particularly, relates to a method for exchanging firmware which is installed in the disk array apparatus, a program for exchanging firmware and a storage medium which stores the program.

BACKGROUND ART

In recent years, a disk array apparatus which combines a plurality of disk apparatuses such as a magnetic disk apparatus or an optical disk apparatus has been used widely as demand for storing data has been more increasing. The disk array apparatus processes I/O (Input/Output) instructions issued from a plurality of upper level apparatuses simultaneously. Moreover, the disk array apparatus processes a plurality of instructions to a plurality of disk apparatuses simultaneously.

It is desirable that the disk array apparatus is always working since it is necessary for the disk array apparatus to memorize and store a large amount of data. However, it is necessary in some cases to exchange firmware, which is working practically on the disk array apparatus, in order to debug the firmware or to get rid of a security hole.

As a related art on firmware of the disk array apparatus, and in particular on exchange of firmware, following documents, for example, are disclosed. Japanese Patent Application Laid-Open No. 2000-215042 (patent document 1) discloses technology that firmware for update is stored in a standby plane of a memory in advance and an address conversion apparatus converts an apparent address. According to the technology disclosed in the patent document 1, the firmware is exchanged without stopping a computer system. Japanese Patent Application Laid-Open No. 2006-031312 (U.S. counterpart application thereof is US 2006/0015861A1) (patent document 2) discloses a computer system which includes a plurality of blades. According to the patent document 2, one blade, which includes firmware to be exchanged, transfers service to other blade. Afterward, the blade is shut down and then, the firmware is exchanged.

Japanese Patent Application Laid-Open No. 2006-260395 (patent document 3) discloses a program loading method with which a program is assigned to virtual space and loaded into a physical memory. Japanese Patent Application Laid-Open No. 2006-338217 (patent document 4) discloses a storage apparatus each of whose modules has a plurality of CPUs (Central Processing Units) and firmware. Specifically, the patent document 4 discloses technology that a process of each module is concentrated at one CPU of the module and other CPU exchanges firmware during the concentration time. Japanese Patent Application Laid-Open No. 1999-237957 (U.S. counterpart application thereof is U.S. Pat. No. 6,240,470B1) (patent document 5) exemplifies technology that necessary data are evacuated and then, firmware is exchanged, as technology of hot standby exchange of firmware.

SUMMARY

An object of the present invention is to provide a disk array apparatus, a method for exchanging firmware, a program for exchanging firmware and a storage medium which stores the program, which can exchange firmware without substantial cost increase and without stopping operation.

A disk array apparatus, according to an exemplary aspect of the invention, which includes a plurality of disk apparatuses and which reads and writes data of the disk apparatus based on an I/O instruction issued by a host computer, includes: a CPU which carries out a first firmware; a memory which stores the first firmware in a first storage area of physical address space; and a TLB (Translation Look-aside Buffer) which belongs to the CPU and makes the first storage area of the physical address space of the memory associated with a first logical area of logical address space, wherein in case that the CPU receives a second firmware and an instruction to exchange firmware, the CPU stores the second firmware in a second storage area of the physical address space of the memory, and updates the TLB to make the second storage area associated with the first logical area.

Further, a method for exchanging firmware, according to other exemplary aspect of the invention, in a disk array apparatus which reads and writes data of a plurality of disk units based on an I/O instruction issued from a host computer and which includes a CPU to carry out a first firmware, a memory to store the first firmware in a first storage area of physical address space, and a TLB (Translation Look-aside Buffer) belonging to the CPU to makes the physical address space of the memory associated with logical address space, includes: making the first storage area of the physical address space associated with a first logical area of the logical address space in the TLB; first receiving a second firmware and an instruction to exchange firmware; storing the second firmware in a second storage area of the physical address space of the memory; and first updating the TLB to make the second storage area associated with the first logical area.

Further, a firmware exchanging program, according to other exemplary aspect of the invention, to make a CPU of a disk array apparatus, which includes the CPU to carry out a first firmware, a memory to store the first firmware in a first storage area, and a TLB (Translation Look-aside Buffer) belonging to the CPU to make physical address space of the memory associated with logical address space, and which reads and writes data of a plurality of disk units based on an I/O instruction issued from a host computer, carry out: an association step to make the first storage area of the physical address space associated with a first logical area of the logical address space in the TLB; a first receiving step to receive a second firmware and an instruction to exchange firmware; a storing step to store the second firmware in a second storage area of the physical address space of the memory; and a first updating step to update the TLB to make the second storage area associated with the first logical area.

BRIEF DESCRIPTION OF THE DRAWINGS

Exemplary features and advantages of the present invention will become apparent from the following detailed description when taken with the accompanying drawings in which:

FIG. 3A to FIG. 3C are conceptual diagrams showing storage areas in physical address space and logical address space inside RAM shown in FIG. 2;

EXEMPLARY EMBODIMENT

First Exemplary Embodiment

Next, a detailed explanation will be given for the first exemplary embodiment of the present invention with reference to the drawings.

Figure 1:
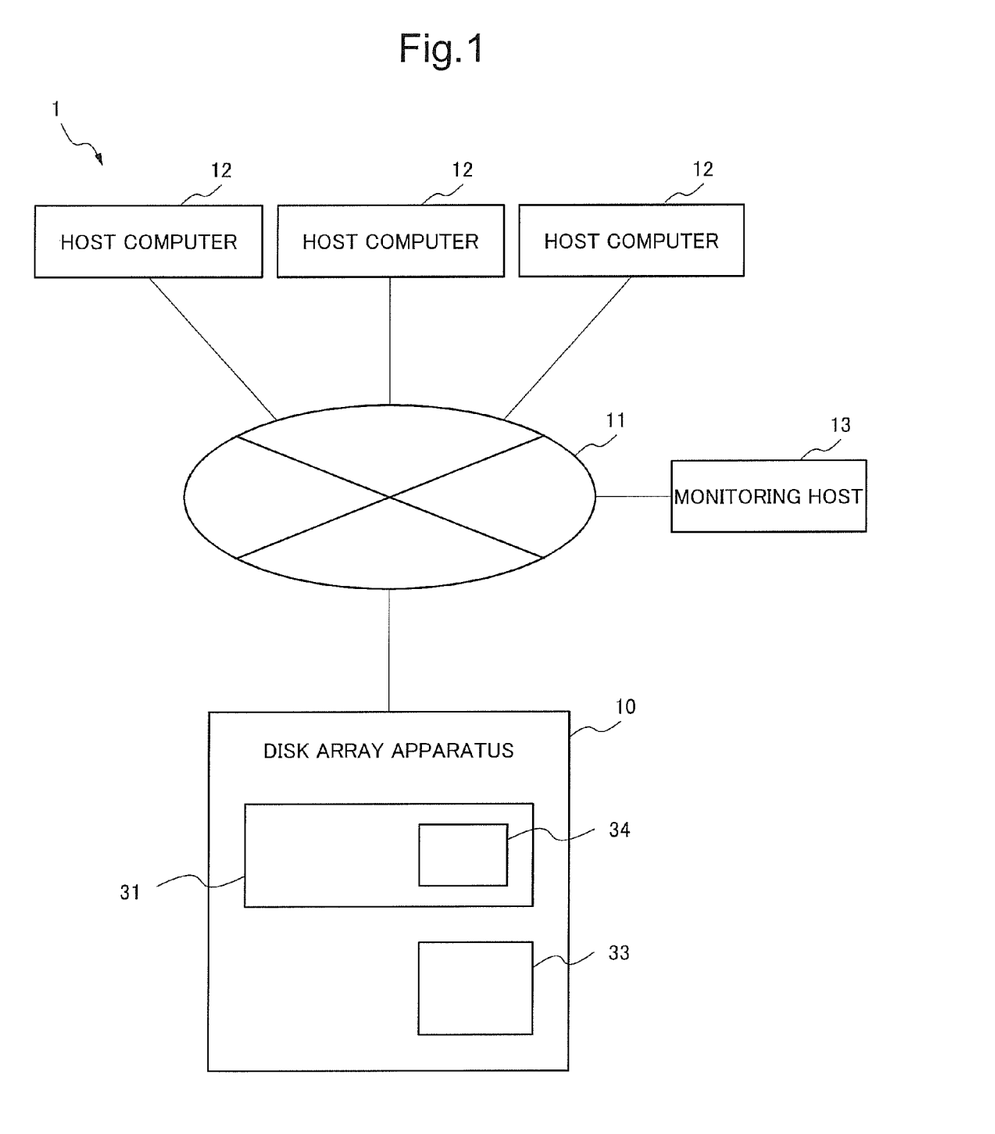
FIG. 1 is a block diagram showing a configuration of a disk array system including a disk array apparatus according to a first exemplary embodiment of the present invention.

FIG. 1 is a block diagram showing a configuration of a disk array system 1 including a disk array apparatus 10 according to a first exemplary embodiment of the present invention. The disk array system 1 includes a disk array apparatus 10, one or a plurality of host computers 12, a monitoring host 13 and a network 11. The network 11 is LAN (Local Area Network), WAN (Wide Area Network), SAN (Storage Area Network) or the like. The network 11 connects the disk array apparatus 10, the host computer 12 and the monitoring host 13 each other. Here, while the monitoring host 13 includes a constituent for maintenance such as a maintenance system, a maintenance terminal or the like, detail description on the monitoring host 13 is omitted.

The disk array apparatus 10 operates based on a first firmware. Accordingly, the disk array apparatus 10 reads and writes data in response to an I/O instruction issued from one or a plurality of host computers 12 such as a read instruction, a write instruction and a halt instruction.

Operating state of the disk array apparatus 10 is monitored by the monitoring host 13. The disk array apparatus 10 reports the operating state of the disk array apparatus 10 to the monitoring host 13 periodically. The monitoring host 13 transmits an instruction to exchange the firmware and transmits simultaneously a new firmware (updated firmware as a second firmware) for exchanging for the first firmware to the disk array apparatus 10 according to necessity.

Further, in FIG. 1, the disk array apparatus 10, the host computer 12 and the monitoring host 13 are connected to the same network 11. However, it may be preferable that the disk array apparatus 10 and the monitoring host 13 are connected each other via a network different from the network 11. For example, the disk array apparatus 10 and the monitoring host 13 may be connected each other via a network which is dedicated to monitoring over a telephone line or the like.

As will be described in detail later, the disk array apparatus 10 includes a CPU (Central Processing Unit) 31, a memory 33 and a TLB (Translation Look-aside Buffer) 34. The CPU 31 carries out a first firmware (a firmware before being updated). The memory 33 stores the first firmware in a first storage area of physical address space. The TLB 34 which belongs to the CPU 31 makes the first storage area of the physical address space of the memory 33 associated with a first logical area of logical address space. In case that the CPU 31 receives a second firmware (a firmware after being updated) and the instruction to exchange the firmware, the CPU 31 stores the second firmware in a second storage area of the physical address space of the memory 33 and updates the TLB 34 in order to make the second storage area associated with the first logical area.

It is possible to exchange the first firmware for the second firmware without stopping the disk array apparatus and without substantial cost increase according to the configuration. That is, according to the configuration, it is possible to make the second firmware associated with the first logical area through updating TLB which is usually installed in CPU. It is possible to exchange the firmware without substantial cost increase and without stopping the disk array apparatus according to the configuration.

Second Exemplary Embodiment

Figure 2:
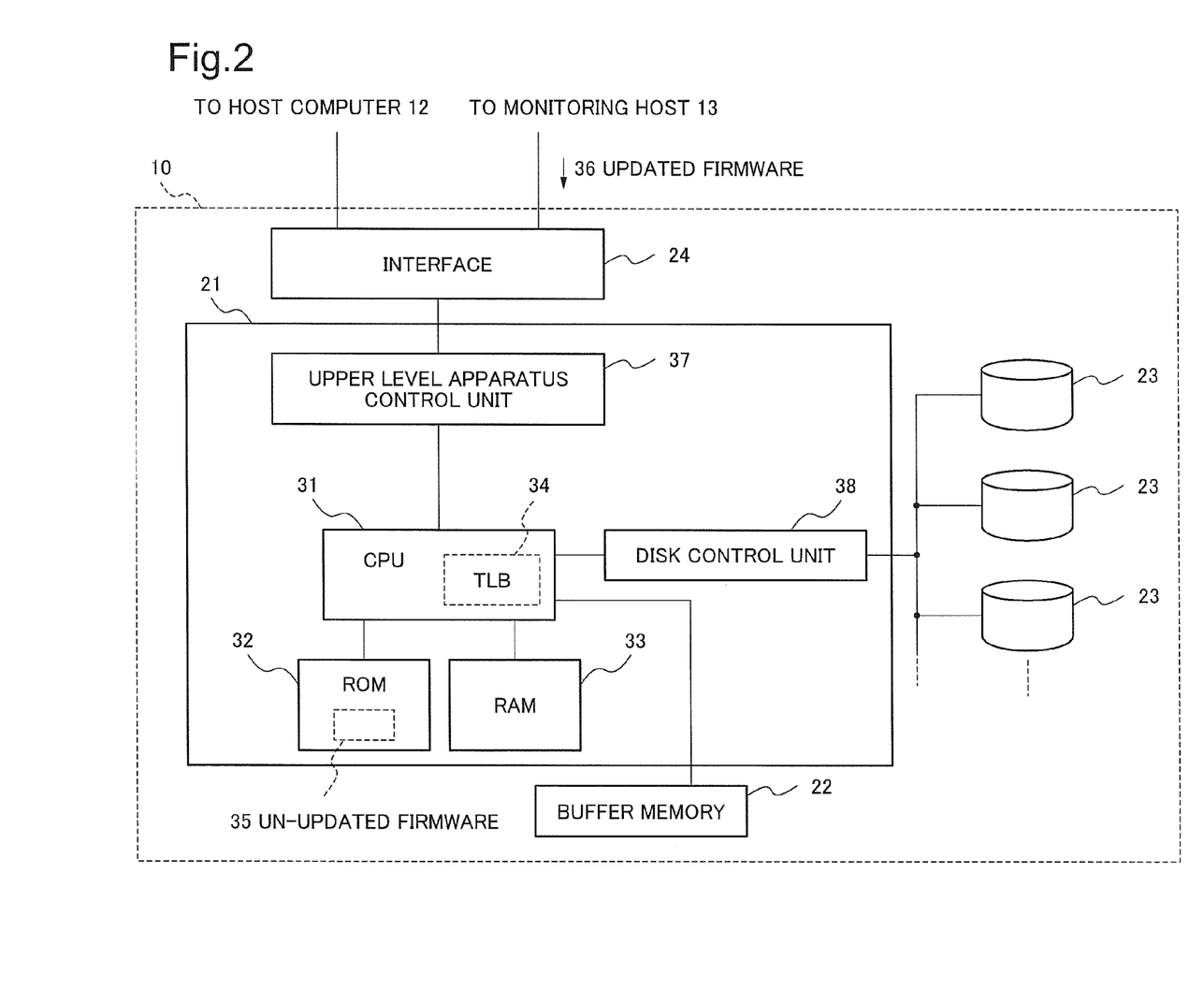
FIG. 2 is a block diagram showing a detailed configuration of a disk array apparatus according to a second exemplary embodiment of the present invention.

FIG. 2 is a block diagram showing a detailed configuration of the disk array apparatus 10 according to the second exemplary embodiment of the present invention. The disk array apparatus 10 includes an array controller 21, a buffer memory 22, a plurality of disk units 23 and an interface 24. The buffer memory 22 stores control information which flows inside the array controller 21. A plurality of disk units 23 are controlled by the array controller 21. The interface 24 is connected to the host computer 12 and the monitoring host 13 via the network 11.

The array controller 21 is a microcomputer which works with a microprogram (an old version firmware before being updated: hereinafter referred to as un-updated firmware 35). The array controller 21 includes the CPU 31, a ROM (Read Only Memory) 32, a RAM (Random Access Memory) as the memory 33, the TLB (Translation Look-aside Buffer) 34, an upper level apparatus control unit 37 and a disk control unit 38.

The CPU 31 carries out the microprogram. The ROM 32 stores the microprogram in advance. The RAM 33 stores work data and the microprogram which is read from the ROM 32. The upper level apparatus control unit 37 connects with the interface 24 to exchange information. The disk control unit 38 connects with the disk unit 23 and controls the disk unit 23.

The TLB 34 is a buffer memory belonging to the CPU 31. The CPU 31 makes the TLB 34 store temporarily information, which indicates association between physical address space and logical address space of the RAM 33. The microprogram (the un-updated firmware 35) can be updated by oneself. The ROM 32 is a flash ROM. The CPU 31 can overwrite the microprogram stored in the ROM 32 for updating.

Figure 3A:
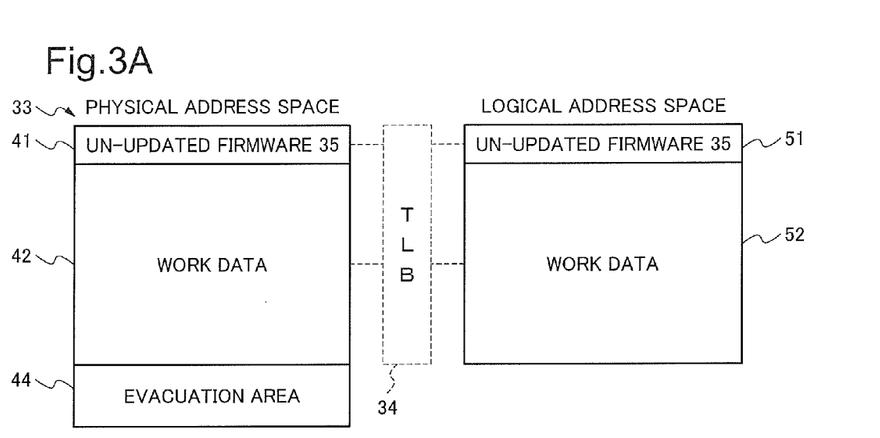
Figure 3B:
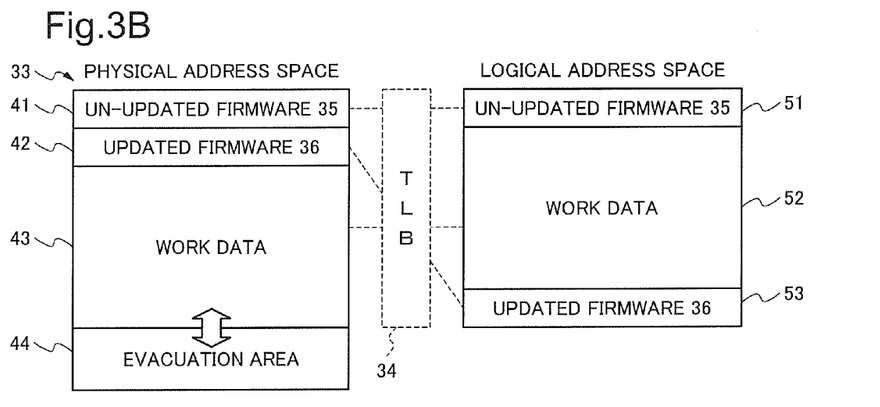
Figure 3C:
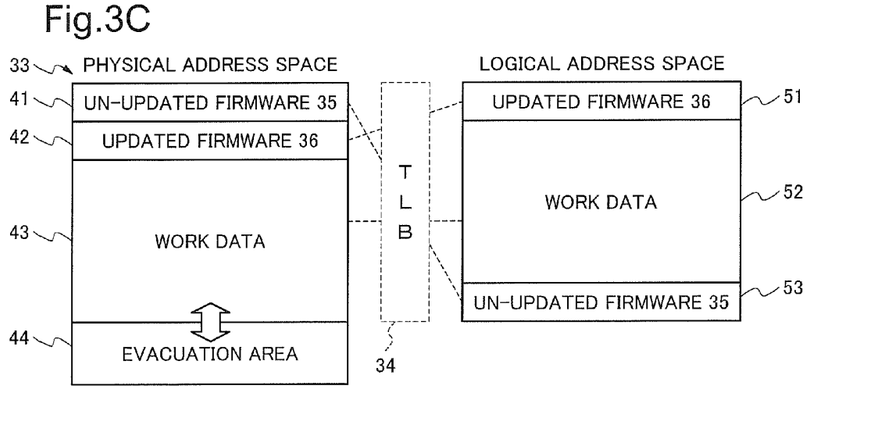

FIG. 3A to FIG. 3C are conceptual diagrams showing storage areas in the physical address space and the logical address space inside the RAM 33 shown in FIG. 2. In case that the disk array apparatus 10 is activated, the CPU 31 reads the un-updated firmware 35 from the ROM 32, and stores the un-updated firmware 35, which is read from the ROM 32, in a first storage area 41 which is positioned at head area of the storage area of the RAM 33 (FIG. 3A). A second storage area 42 is an area following the first storage area 41. The second storage area 42 stores work data which is generated through carrying out the un-updated firmware 35. An area following the second storage area 42 is an evacuation area 44 mentioned later.

At this stage, the TLB 34 indicates that the logical address is identical with the physical address of the RAM 33. In other words, the TLB 34 indicates that a first logical area 51 is corresponding to the first storage area 41 and a second logical area 52 is corresponding to the second storage area 42. The CPU 31 refers to the RAM 33 through converting the logical address into the physical address by use of the TLB 34.

It is supposed that the interface 24 receives an updated firmware 36 (a recent version firmware after being updated) and the instruction to exchange the firmware from the monitoring host 13. The CPU 31 stores the updated firmware 36 in the second storage area 42 (FIG. 3B). As shown in FIG. 3B, the second storage area 42 is a storage area following the first storage area 41 of the physical address space of the RAM 33. The work data, which was generated through carrying out the un-updated firmware 35 and was stored in the second storage area 42, is stored in a third storage area 43. The third storage area 43 is a storage area following the second storage area 42. An area following the third storage area 43 is the evacuation area 44 mentioned later.

Simultaneously, the CPU 31 makes the TLB 34 change so that the first logical area 51 is corresponding to the first storage area 41, and the second logical area 52 is corresponding to the third storage area 43, and a third logical area 53 is corresponding to the second storage area 42 in the logical address space indicated by the TLB 34. In other words, with regard to the logical address space viewed from the CPU 31, there is un-updated firmware 35 in the first logical area 51, and there is the work data of the un-updated firmware 35 in the second logical area 52 following the first logical area 51. While there is the updated firmware 36 in the third logical area 53, the updated firmware 36 has no relation particularly to operation of the CPU 31 at this stage.

In other words, memory assignment in the memory space after receiving the updated firmware 36 is identical with one before receiving the updated firmware 36. Therefore, since there is no influence to operation of the CPU 31 in particular, it is possible to continue carrying out the un-updated firmware 35, based on the I/O instruction issued from the host computer 12. Of course, it is not necessary to stop operation of the disk array apparatus 10.

Next, the CPU 31 changes contents of the TLB 34. As shown in FIG. 3C, there is no change in the storage area of the physical address space at all. However, the contents of the TLB 34 are changed so that the first logical area 51 is corresponding to the second storage area 42, and the second logical area 52 is corresponding to the third storage area 43, and the third logical area 53 is corresponding to the first storage area 41 in the logical address space.

As a result, the microprogram which is carried out by the CPU 31 is changed from the un-updated firmware 35 to the updated firmware 36 (i.e., exchanging firmware is done). It is possible to exchange the firmware without stopping operation of the array controller 21.

However, in some cases, the exchange of the firmware may cause influence to the work data stored in the second logical area 52 (the third storage area 43). Therefore, it is preferable that the work data is evacuated temporarily from the second logical area 52 (third storage area 43) to the evacuation area 44, which follows the third storage area 43 in the physical address space before contents of the TLB 34 is changed. Moreover, it is preferable that afterward, contents of the TLB 34 is changed, and then, the work data, which is evacuated, is returned to the second logical area 52 (third storage area 43) after completion of the change of contents of the TLB 34. Since it is possible to carry out this procedure in a short time, it is possible to carry out this procedure without stopping operation of the array controller 21.

Figure 4:
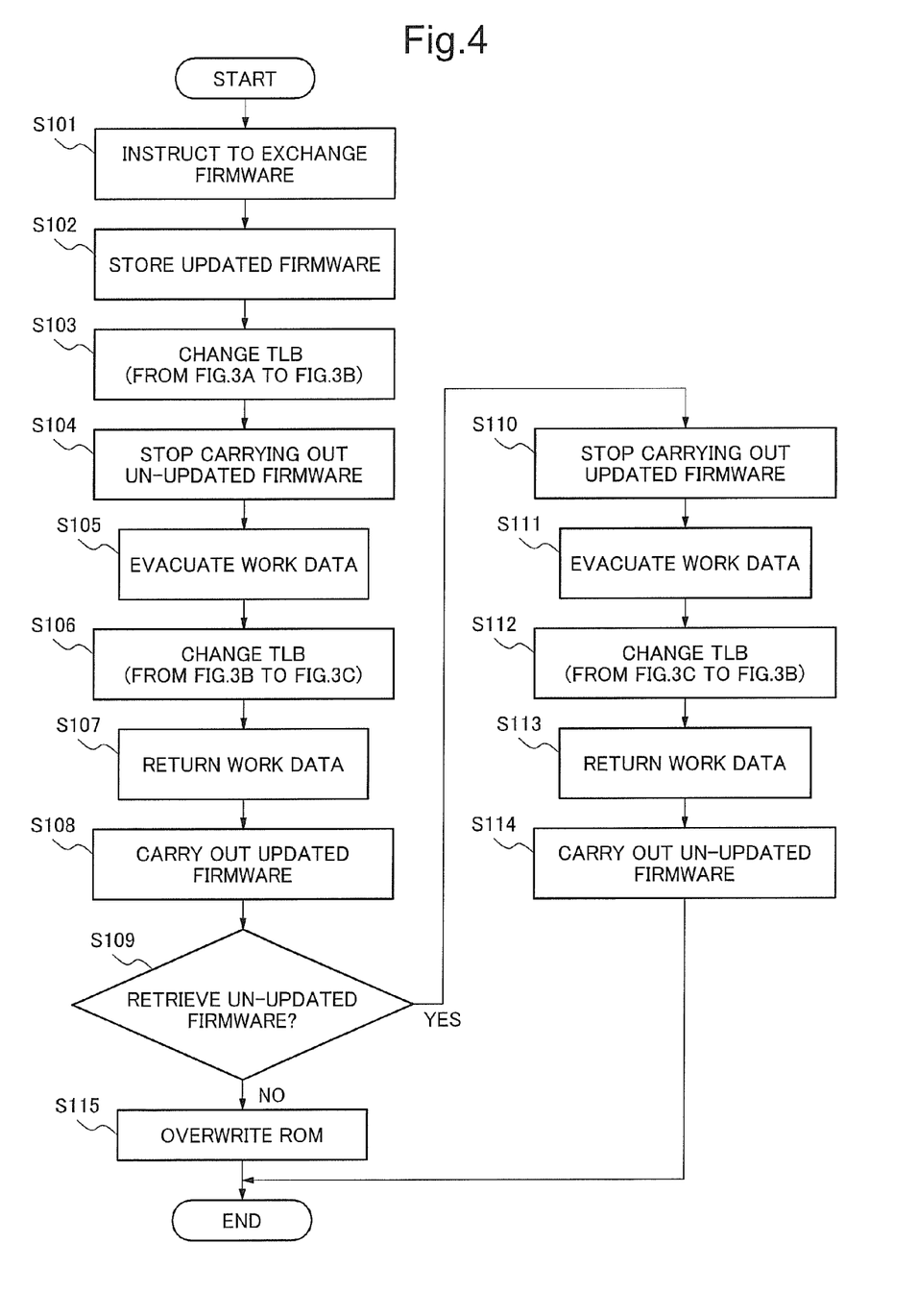
FIG. 4 is a flowchart showing a procedure which CPU carries out in case of exchanging firmware as shown in FIG. 3A to FIG. 3C.

FIG. 4 is a flowchart showing a procedure which CPU carries out in case of exchanging firmware as shown in FIG. 3A to FIG. 3C. The CPU 31 receives the instruction to exchange the firmware from the monitoring host 13 (Step S101), and stores firstly the updated firmware 36 in the second storage area 42 (Step S102). Next, as shown in FIG. 3B, the CPU 31 updates the TLB 34. That is, the CPU 31 changes contents of the TLB 34 (Step S103).

Then, the CPU 31 suspends carrying-out of the un-updated firmware 35, which is based on the I/O instruction (Step S104). The CPU 31 makes the work data evacuated from the second logical area 52 (third storage area 43) to the evacuation area 44 (Step S105). Moreover, as shown in FIG. 3C, the CPU 31 updates the TLB 34. That is, the CPU 31 changes contents of the TLB 34 (Step S106). Next, the CPU 31 returns the work data, which is evacuated temporarily, to the second logical area 52 (third storage area 43) (Step S107). Moreover, the CPU 31 starts carrying out the updated firmware 36 (Step S108).

Here, in some cases, since the updated firmware 36 does not work well, operation of the disk array apparatus 10 may includes wrong operation. Accordingly, an operator monitors operation of the disk array apparatus 10 by use of the monitoring host 13. If there exists wrong operation in operation of the disk array apparatus 10, the monitoring host 13 transmits an instruction to cancel exchanging the firmware to the array controller 21 in order to retrieve the un-updated firmware 35 (Step S109).

In case that the CPU 31 receives the instruction to cancel exchanging the firmware, the CPU 31 stops carrying out the updated firmware 36 (Step S110). Next, the CPU 31 makes the work data evacuated from the second logical area 52 (third storage area 43) to the evacuation area 44 (Step S111). Moreover, as shown in FIG. 3B, the CPU 31 updates the TLB 34. That is, the CPU 31 changes contents of the TLB 34 (Step S112). Next, the CPU 31 returns the work data, which is evacuated, to the second logical area 52 (third storage area 43) (Step S113). Finally, the CPU 31 starts to carry out the un-updated firmware 35 (Step S114) and ends the procedure to exchange the firmware.

Steps S110 to S114 are identical with Steps S104 to S108 respectively, except that the TLB 34 is returned to a previous state, that is, a state before the change (state shown in FIG. 3B). This procedure does not cause any change for the physical address space of the RAM 33 and does not stop operation of the array controller 21 as a matter of course. In order to carry out this procedure, it is desirable to store temporarily state of the TLB 34, which has not been changed yet, at any area in the RAM 33, when the TLB 34 is changed from the state shown in FIG. 3B to the state shown in FIG. 3C (Step S106 in FIG. 4).

In case that there is no wrong operation in operation of the disk array apparatus 10 through carrying out the updated firmware 36, the disk array apparatus 10 ends the procedure to exchange the firmware as it is and continues to carry out the updated firmware 36. In this case, it may be preferable that the un-updated firmware 35, which is stored in the ROM 32, would be overwritten by the updated firmware 36, based on the instruction to complete exchanging the firmware which is transmitted from the monitoring host 13 (Step S115).

Steps S101 to S107 and Step S114 out of the above mentioned steps are carried out by the un-updated firmware 35. Moreover, Steps S108 to S113 and Step S115 are carried out by the updated firmware 36. The exemplary embodiments of the present invention can be realized only through replacing the conventional firmware updating or exchanging procedure with the procedure described above in these firmware.

According to the configuration which has been described above, it is possible to exchange the firmware without stopping operation of the array controller 21. As a result, it is not necessary to stop operation of the upper level apparatus of the disk array apparatus 10 (the host computer 12, the monitoring host 13 or the like). Moreover, even if there exists wrong operation in carrying out the updated firmware 36, it is possible to retrieve the un-updated firmware 35 quickly. Of course, it is possible to retrieve the un-updated firmware 35 without stopping operation of the array controller 21.

The TLB 34, which is indispensable in order to obtain the above mentioned effect, generally belongs to the CPU 31. Accordingly, there is no need to add new hardware particularly in order to realize the exemplary embodiments of the present invention and there is mere need to exchange the un-updated firmware 35 and the updated firmware 36. As a result, substantial cost increase is not caused.

Third Exemplary Embodiment

Figure 5:
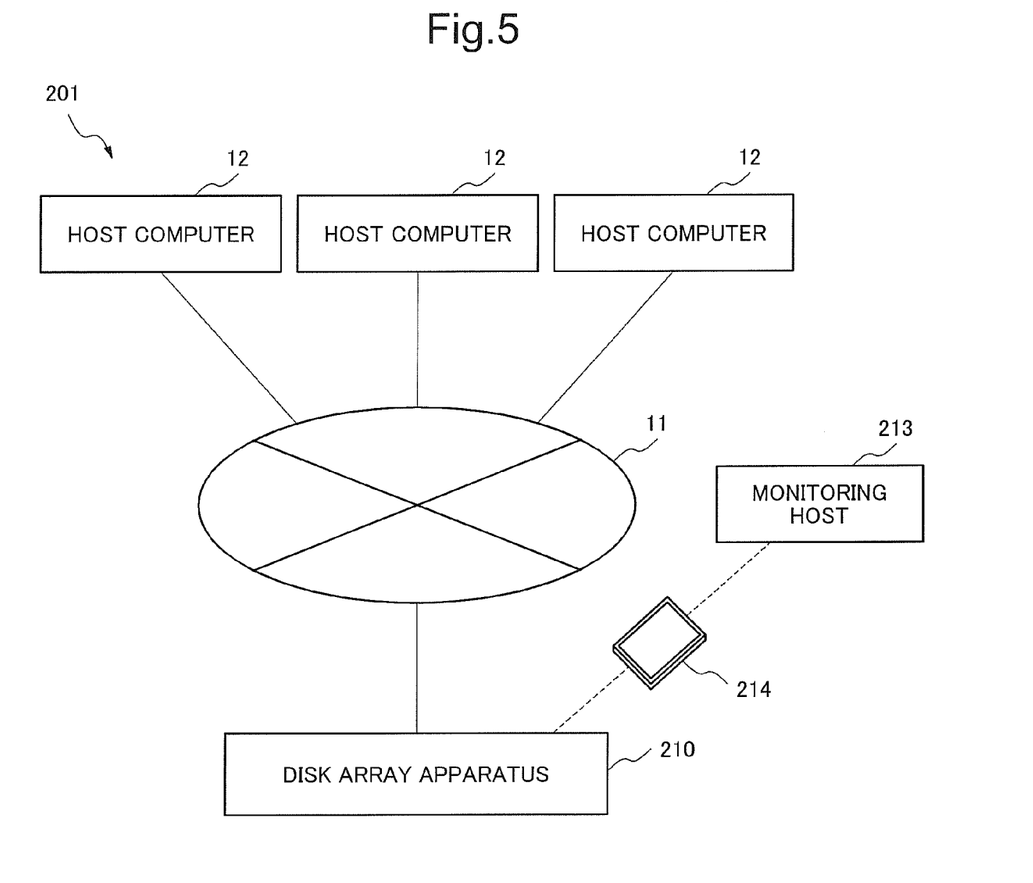
FIG. 5 is a block diagram showing a configuration of a disk array system including a disk array apparatus according to a third exemplary embodiment of the present invention.

Next, the third exemplary embodiment of the present invention will be described. FIG. 5 is a block diagram showing a configuration of a disk array system 201 including a disk array apparatus according to the third exemplary embodiment of the present invention. Since the disk array system 201 includes a plurality of constituents identical with ones of the disk array system 1 according to the first and the second exemplary embodiments of the present invention, the identical constituent of the disk array system 201 has reference number identical with one of the disk array system 1 and its description is omitted.

The disk array system 201 includes a disk array apparatus 210, one or a plurality of the host computers 12, and the network 11 such as LAN, WAN and SAN, which connects the disk array apparatus 210 and one or a plurality of the host computers 12 each other. However, it is different from the first exemplary embodiment of the present invention that a monitoring host 213 does not connect to the disk array apparatus 210 via the network 11. For this reason, a removal storage medium 214 mentioned later is applied in order to obtain information on the disk array apparatus 210 in case of failure.

The removal storage medium 214 has an interface through which the removal storage medium 214 can read information obtained from a general-purpose type read-out apparatus (not shown). The monitoring host 213 can write information into the removal storage medium 214 and read information from the removal storage medium 214 via the read-out apparatus. Further, it may be preferable that the read-out apparatus is built in or installed in the monitoring host 213 or the read-out apparatus is accessed via the network 11 by the monitoring host 213.

Figure 6:
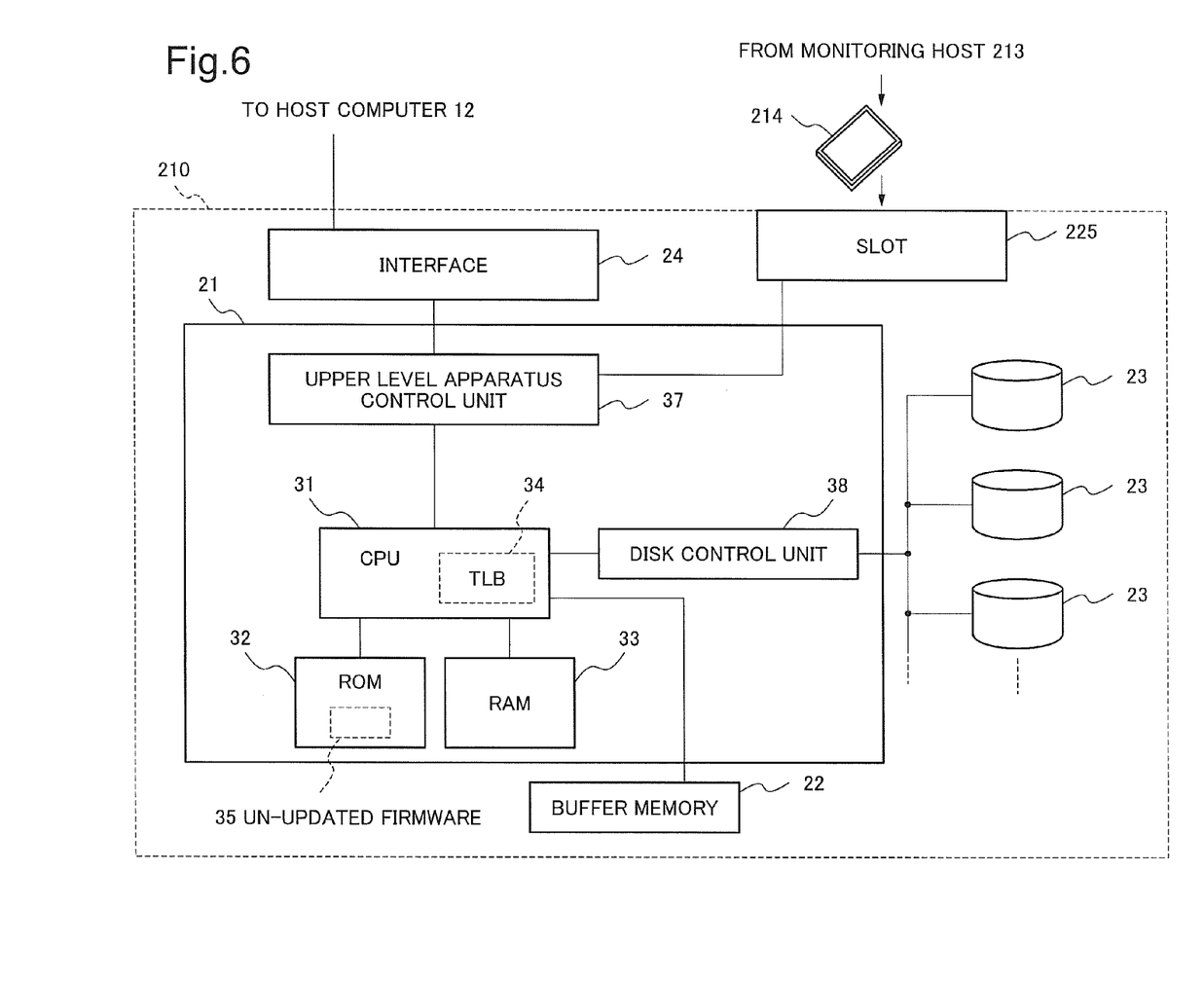
FIG. 6 is a block diagram showing a detailed configuration of the disk array apparatus shown in FIG. 5.

FIG. 6 is a block diagram showing a detailed configuration of the disk array apparatus 210 shown in FIG. 5. The disk array apparatus 210 includes the array controller 21, the buffer memory 22, a plurality of disk units 23, the interface 24 and a slot 225. The interface 24 connects with the host computer 12 via the network 11. The slot 225 is fitted to the removal storage medium 214. Further, it may be preferable that the removal storage medium 214 is, for example, a card type flash memory, a magnetic disk, an optical disk or the like.

While the disk array apparatus 210 is connected to one or a plurality of host computers 12, the disk array apparatus 210 is not connected to the monitoring host 213. Accordingly, the array controller 21 controls the removal storage medium 214 to store an operation state of the disk array apparatus 210. The removal storage medium 214 is exchanged periodically. The removal storage medium 214 which is detached from the disk array apparatus 210 is attached to the read-out apparatus of the monitoring host 213 and consequently, data which is stored in the removal storage medium 214 is read by the monitoring host 213.

Then, according to necessity, an operator of the monitoring host 213 writes the updated firmware 36 in the removal storage medium 214 which is attached to the read-out apparatus. When the removal storage medium 214 which stores the updated firmware 36 is fitted into the card slot 225, the array controller 21 judges that the fitting means the instruction to exchange the firmware. Then, the array controller 21 carries out the procedure for exchanging the firmware which is identical procedure shown in FIG. 3A to FIG. 4. That is, the array controller 21 controls to changes the microprogram, which is carried out by the CPU 31, from the un-updated firmware 35 to the updated firmware 36. Accordingly, description on procedure for exchanging the firmware is omitted here.

However, the monitoring host 213 can not transmit the instruction, which instructs to retrieve the un-updated firmware 35 in Step S109 of FIG. 4, to the disk array apparatus 210 directly. Therefore, the procedure to retrieve the un-updated firmware 35 is carried out, for example, through handling the array controller 21 directly. Or it may be preferable that the procedure is carried out through fitting the removal storage medium 214, which stores the un-updated firmware 35, into the slot 225.

According to the above mentioned configuration, it is possible to exchange the firmware in the disk array apparatus 210, which is not connected to the monitoring host 213 directly, similarly to the first and the second exemplary embodiments of the present invention and consequently, it is possible to obtain the same effect as one of the first and the second exemplary embodiments of the present invention.

Other Exemplary Embodiment

It may be preferable that the procedure for exchanging the firmware shown in FIG. 3A to FIG. 4 is described as a firmware exchanging program which is carried out by the CPU 31, and the program is stored in the storage medium. The storage medium may be similar to the above-mentioned removal storage medium 214. It is possible that the CPU 31 makes a memory such as RAM store the firmware exchanging program which the read-out apparatus reads from the storage medium and then, carries out the program. It may be preferable that the firmware exchanging program is stored in the removal storage medium 214.

In case that firmware which is working in a disk array apparatus is exchanged, it is general that the disk array apparatus is suspended, and meanwhile, installs the updated new firmware and the disk array apparatus is restarted afterward. However, it takes much time in case that the general method is applied. Therefore, it is necessary to halt not only the disk array apparatus but also the upper level apparatus and as a result, service is discontinued. Even if exchange to new firmware is completed, it is necessary in some cases to retrieve the old firmware since there is a problem in carrying out the new firmware. In the case, service is discontinued similarly to the case of exchanging the firmware.

In order to settle the problem, the technologies disclosed in the above-mentioned patent documents 1 to 5 or the like were developed. In particular, according to the technology disclosed in the patent document 1, it is possible to exchange the firmware without stopping any other operation at all through converting an apparent address. However, it is necessary to apply additionally a proprietary microcomputer which is called an address conversion apparatus and consequently, implementation of the technology causes cost increase. Even if the technology disclosed in the patent document 1 is combined with the technologies disclosed in the patent documents 2 to 5, the problem that system cost increases cannot be settled.

An exemplary advantage according to the present invention is that it is possible to exchange the first firmware to the second firmware without substantial cost increase and without stopping the disk array apparatus. That is, according to the configuration of the present invention, it is possible to make the second firmware associated with the first logical area through changing contents of the TLB which is usually installed in the CPU. According to the configuration, it is possible to exchange the firmware without substantial cost increase and without stopping the operation.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A disk array apparatus which includes a plurality of disk apparatus and is connected to one or more host computers, and reads and writes data of said disk array apparatus based on an I/O instruction issued by said one or more host computers, comprising:
   a ROM which stores a first firmware;
   a CPU which carries out said first firmware;
   a RAM which stores said first firmware in a first storage area of physical address space, wherein said CPU carrying out said first firmware from said RAM such that said first firmware is executed from said RAM and not from said ROM prior to firmware exchange; and
   a TLB (Translation Look-aside Buffer) which is a buffer memory which belongs to said CPU, and stores information which makes said first storage area of physical address space of said RAM associated with a first logical area of logical address space,
   wherein said CPU has a function which, in case an instruction to exchange firmware and a second firmware are received, evacuates work data of said first firmware to an evacuation area, which is set in said RAM in advance, stores said second firmware in a second storage area of said physical address space of said RAM, updates said TLB to make said second storage area associated with said first logical area, and after that, makes said work data evacuated return from evacuation, and makes said second firmware continue to work with said work data,
   wherein said CPU carries out said second firmware from said RAM such that said second firmware is executed from said RAM and not from said ROM subsequent to firmware exchange, and
   wherein said first firmware is exchanged for said second firmware such that said second firmware becomes operable for said disk array apparatus without said second firmware having to be stored in said ROM.

2. The disk array apparatus according to claim 1, wherein said CPU has a function, in case that an instruction to cancel exchanging firmware is received, to update said TLB to make said first storage area associated with said first logical area.

3. The disk array apparatus according to claim 2, wherein said CPU has a function, in case that an instruction to complete exchanging firmware is received, to overwrite said first firmware stored in said ROM with said second firmware.

4. The disk array apparatus according to claim 2, wherein said CPU receives said instruction to exchange firmware and said second firmware from a monitoring host connected via a network in advance.

5. The disk array apparatus according to claim 2, wherein said disk array apparatus reads said second firmware from a removable storage medium which is fitted to a slot which is included in advance.

6. A method for exchanging firmware in an array controller which includes a ROM to store a first firmware, a CPU to carry out said first firmware, a RAM to store said first firmware in a first storage area, and a TLB (Translation Look-aside Buffer) which is a buffer memory belonging to said CPU to store information to make physical address space of said RAM associated with logical address space and is connected to one or more host computers, and reads and writes data of a plurality of disk apparatus included in a disk array apparatus by an I/O instruction from said one or more host computers, comprising:
   a first association step which makes said first storage area of said physical address space associated with a first logical area of said logical address space by said TLB;
   a first receiving step which receives an instruction of exchanging firmware and an input of second firmware after said first association step;
   a storing step which stores said second firmware in a second storage area of said physical address space of said RAM corresponding to said first receiving step;
   an evacuation step which evacuates work data of said first firmware to an evacuation area, which is set in said RAM in advance;
   a second association step which updates said TLB following said storing step and makes said second storage area associated with said first logical area; and
   a returning step which makes said work data, which is evacuated, return, and makes said second firmware continue to work with said work data,
   wherein said CPU carries out said first firmware from said RAM such that said first firmware is executed from said RAM and not from said ROM prior to firmware exchange,
   wherein said CPU carries out said second firmware from said RAM such that said second firmware is executed from said RAM and not from said ROM subsequent to firmware exchange, and
   wherein said first firmware is exchanged for said second firmware such that said second firmware becomes operable for said disk array apparatus without said second firmware having to be stored in said ROM.

7. The method for exchanging firmware according to claim 6, further comprising:
   a second receiving step which receives an input of an instruction to cancel exchanging firmware after said first receiving step; and
   a third association step which, corresponding to said second receiving step, updates said TLB and makes said first storage area associated with said first logical area.

8. The method for exchanging firmware according to claim 7, further comprising:
   a third receiving step which receives an input of an instruction to complete exchanging firmware after said first receiving step; and
   an overwriting step which, corresponding to said third receiving step, overwrites said first firmware stored in said ROM with said second firmware.

9. A firmware exchanging program stored in an array controller which includes a ROM to store a first firmware, a CPU to carry out said first firmware, a RAM to store said first firmware in a first storage area, and a TLB (Translation Lookaside Buffer) which is a buffer memory belonging to said CPU to store information to make physical address space of said RAM associated with logical address space and is connected to one or more host computers, and reads and writes data of a plurality of disk apparatus included in a disk array apparatus by an I/O instruction from said one or more host computers for making said CPU carry out processing comprising:

first association processing which makes said first storage area of said physical address space associated with a first logical area of said logical address space by said TLB;

first receiving processing which receives an instruction of exchanging firmware and an input of second firmware after said first association processing;

storing processing which stores said second firmware in a second storage area of said physical address space of said RAM corresponding to said first receiving processing;

evacuation processing which evacuates work data of said first firmware to an evacuation area, which is set in said RAM in advance;

second association processing which updates said TLB following said storing processing and makes said second storage area associated with said first logical area; and returning processing which makes said work data, which is evacuated, return, and makes said second firmware continue to work with said work data, wherein said CPU carries out said first firmware from said RAM such that said first firmware is executed from said RAM and not from said ROM prior to firmware exchange, wherein said CPU carries out said second firmware from said RAM such that said second firmware is executed from said RAM and not from said ROM subsequent to firmware exchange, and wherein said first firmware is exchanged for said second firmware such that said second firmware becomes operable for said disk array apparatus without said second firmware having to be stored in said ROM.

10. The firmware exchanging program according to claim 9, further comprising:

second receiving processing which receives an input of an instruction to cancel exchanging firmware after said first receiving processing; and third association processing which, corresponding to said second receiving processing, updates said TLB and makes said first storage area associated with said first logical area.

* * * * *